United States Patent
Conti

(10) Patent No.: US 9,141,330 B2
(45) Date of Patent: Sep. 22, 2015

(54) MOBILE INTERFACE TO A SHOW

(71) Applicant: Chris Conti, North Bergen, NJ (US)

(72) Inventor: Chris Conti, North Bergen, NJ (US)

(73) Assignee: Production Resource Group LLC, New Windsor, NY (US)

( * ) Notice: Subject to any disclaimer, the term of this patent is extended or adjusted under 35 U.S.C. 154(b) by 150 days.

(21) Appl. No.: 14/055,511

(22) Filed: Oct. 16, 2013

(65) Prior Publication Data

US 2014/0113598 A1   Apr. 24, 2014

Related U.S. Application Data

(60) Provisional application No. 61/714,499, filed on Oct. 16, 2012.

(51) Int. Cl.
*H04W 24/00*   (2009.01)
*G06F 3/14*   (2006.01)
*H04W 4/04*   (2009.01)
*H04W 4/02*   (2009.01)

(52) U.S. Cl.
CPC ............ *G06F 3/1446* (2013.01); *H04W 4/021* (2013.01); *H04W 4/04* (2013.01)

(58) Field of Classification Search
USPC ...................................... 455/456.3
See application file for complete search history.

(56) References Cited

U.S. PATENT DOCUMENTS 8,214,862 B1 *   7/2012   Lee et al. .................... 725/62

* cited by examiner

*Primary Examiner* — Joel Ajayi
(74) *Attorney, Agent, or Firm* — Law Office of Scott C. Harris, Inc.

(57) ABSTRACT

A computer system that communicates with information indicative of a lighting show, and provides information to users in the audience to allow their phones to be interactive with the show. In one embodiment a lighting designer or show promoter can provide information R that extends the lighting effect on to the user's phone. In another embodiment, the show promoter may provide information indicative of the venue. The information can be location specific, for example information that is provided to a specific client device can be based on the specific location of the client device. This can provide location sensitive lighting information, or maps, or in seat specific information about the venue.

16 Claims, 1 Drawing Sheet

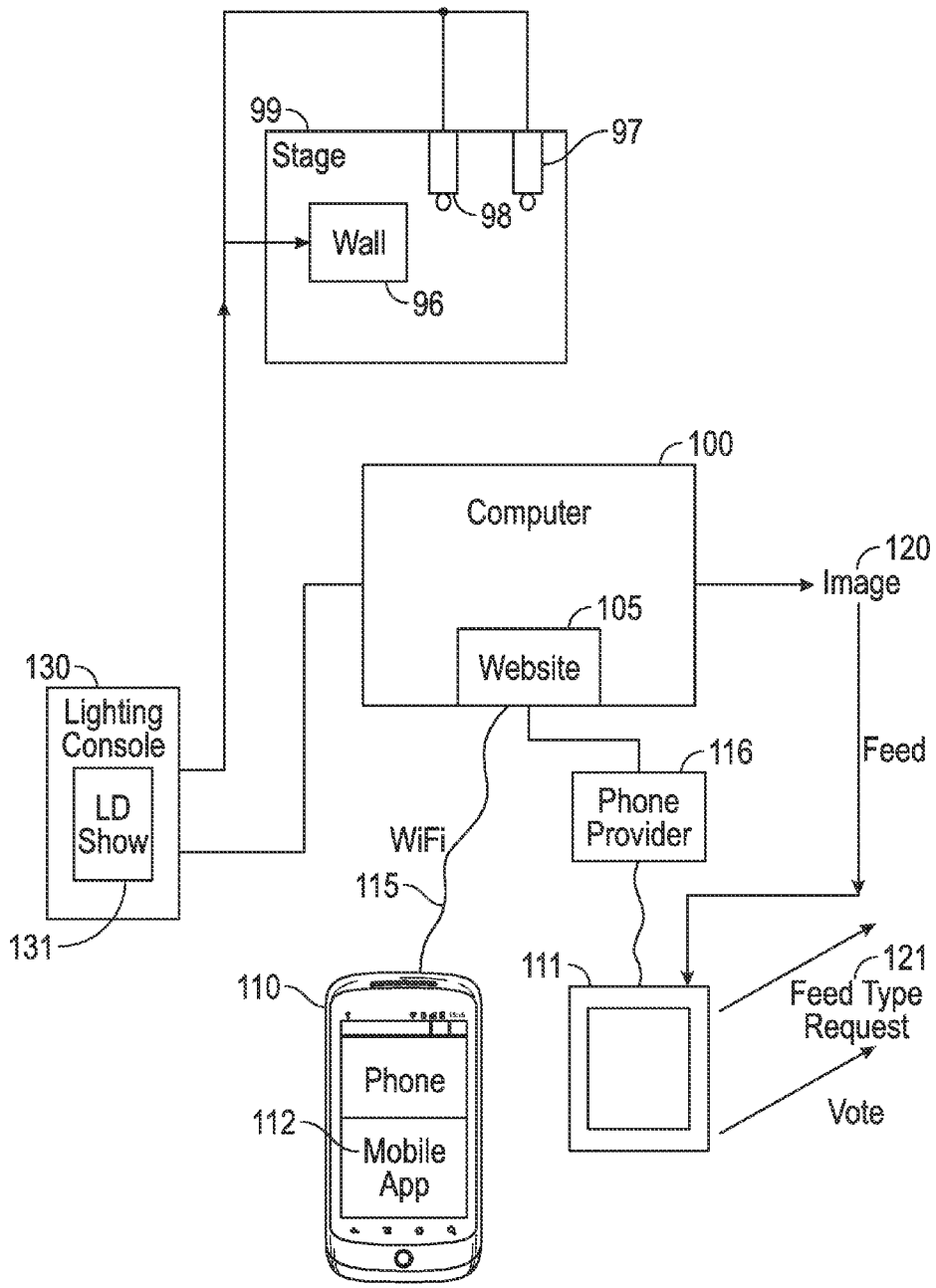

MOBILE INTERFACE TO A SHOW

This application claims priority from provisional application No. 61/714,499 filed Oct. 16, 2012, the entire contents of which are herewith incorporated by reference.

BACKGROUND

People at public gatherings and shows often take interactive actions. One example is at a concert where people will often raise lights of various types such as lighters or flashlights. The shows can include concerts, football games and other venues. The individual interactivity thus creates an effect that includes different parts from different people at different locations in the audience.

SUMMARY

Embodiments describe different ways of choreographing and controlling this individual interactivity of the audience at a public venue, e.g., a show.

BRIEF DESCRIPTION OF THE DRAWINGS the figures show aspects of the invention.
Specifically:
FIG. 1 shows a block diagram.

DETAILED DESCRIPTION

The inventor recognizes that choreography of audience interactivity can create effects that can be matched with the effects created by the professional lighting experience. The choreography of the audience can provide the audience members at an event with a personal interactive experience. It can expand designers creative designs to have greater interactivity with audiences. For example, lighting designer can include effects done by the audience as part of the light experience they provide as part of the stage lighting being controlled by the lighting designer.

Effects as described herein include location based interactivity, where different people in different locations can interact with the show depending on input from the show designer. This also provides event promoters and organizers a direct channel to audience members to present information and feedback.

An embodiment, called the Mobile iMag, uses a computer system 100 that communicates with both information indicative of the lighting show, and also with audience members. In one embodiment, the mobile iMag can be a computer running a website 105 that interacts with a mobile application 112 on user's phones or PDAs shown generically as 110, 111, but it being understood that there could be thousands of such phones interacting with the website 105. In order to maximize the usability of the system, the mobile app 112 should run on his many different kinds of mobile platforms as possible, regardless of operating systems or service providers.

The operation can connect the phone directly via Wi-Fi to the computer 100, shown as 115 in one embodiment. In another embodiment, the phone 111 connects to the website via their cellular provider 116.

In one embodiment, the operation is location sensitive, that is, different results are given to users at different locations.

The mobile app 112 can be downloaded, for example by using a QR Bar code on a ticket or on promotional literature.

Once this website or app is accessed, the audience members are provided content that is related to the specific show. Audience members can interact with the show or event that they are attending, and customize their experience. Some of the ways audience members can interact with the show include the following.

The website 105 can send, and hence the clients can receive, a streamed video signal of the image magnification 120 (iMag), which is commonly displayed on large video screens at events. This is received over the wireless channel. For example, in one embodiment, the iMag can only be received over the local Wi-Fi channel 115 based on information that is provided by the mobile application 112. As another example, this can be received directly from the website.

The users can customize their own iMag feed that is being displayed on their mobile device by making a selection from a group of iMag feeds at 121. For example, these can be different feeds such as a video of the main artists, of the audience, video showing other artists, feed of the stage or of the stage background being displayed, or any other feed that may be available.

Using the app 112, users can vote or provide feedback to the artists and or event organizers on the previous or upcoming event content. For example, the app 112 can periodically ask users what they think of various parts of the show, and the users can provide voting such as thumbs-up/thumbs down, or other kinds of voting.

Users can receive prompting like music lyrics to sing along. This can also be used for example as part of a karaoke event.

Users can receive synced or non synced control signals from lighting, video, scenic, and or audio equipment that trigger specific colors, intensity states and or specific video content play back to extend an events onstage creative design out and into the audience. Example, the computer 100 can be connected to the lighting console 130, that includes instructions such as 131 created by a lighting designer and representing the lighting portion of the show. The lighting console produces an output 135 that controls lighting devices associated with the show such as a video wall 96 as well as lights 97,98. More generally, any light that shines on the stage can be controlled by the lighting console. The instructions 131 represent the lighting designer's design of the show. These instructions 131 can also be communicated to the computer 100, and can include instructions for display on different user's phones. In one embodiment, the locations where the users are sitting in the audience can be obtained by the phone, using automatic location detection, or by entering it into the phone and receiving the information from scanning a QR code on the user's ticket. The individual information sent to the user's phone can be specific to the area of the concert where the users are located. For example, users on stage left may receive pink screens while users on stage might may receive blue screens in order to create an interactive audience experience.

In addition to lighting effects, the promoter can use the application to Provide general information, like venue maps, seating information, as well as general announcements like time left in an intermission locations where refreshments can be obtained, and other information about the venue.

The application can also receive dedicated and directed advertising associated with the application, in a way that it is likely to be looked at by the users.

The application can provide direct public safety announcements in the event of an emergency.

The application can provide pre event, and post event information and highlights.

The application can be used for in-seat purchasing of event concessions and promotional items like swag. In the embodiment where the system has received the user seat number, users can order food and drinks, or order promotional merchandise to be delivered to their seat.

The above has described 2 types of location-based interactivity. The location information can be ascertained not only via the standard methods commonly found on mobile devices, like WiFi, Cellular, and GPS but also via user specified information like seat section and number, ticket number, and or QR bar code on a ticket, promotional literature, and or signage.

The location-based interactivity can also allow for other applications as described herein.

The audience member's mobile device acts as a single pixel in a large audience based video screen.

Display event content that would be unique to the location where the audience member is. For example, when the user is in a specific seat location, they may be receiving specific views or view blockages that can be compensated by the application by streaming a video that shows what is behind the blockage.

Receive synced or non synced control signals from lighting, video, scenic, and or audio equipment that trigger location specific colors, intensity states and or location specific video content play back.

Provide location specific general information like closest vendors, bathrooms, or exits.

Provide location specific advertising.

Have in seat purchased concessions and promotional items, like swag, delivered directly to the audience member's seat or location. That is, the user can indicate their seat or have their seat detected by a location sensitive part, and order food or items to be delivered.

Different embodiments allow the device to be operable on both open and closed dedicated and or non-dedicated networks via Wi-Fi or Cellular signals.

In one embodiment, only people who have the tickets can use the application, and each ticket can have a scannable code or integer code to allow only that person to use the application. That code can also provide the user's location to the system t enable the location sensitive information.

Another embodiment can allow the application to be open to the general public, so anyone can use the application and receive the information.

Mobile iMag can receive Lighting, Audio, Video and or Scenic information via industry standard communication protocols.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other applications can be used, and other functions can be carried out.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The lights which are described herein can be computer-controlled, and can be controlled for example over a network or DMX connection by sending remote controls over that connection. These lights can also, for example, the remotely controllable for pan and tilt.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system, comprising:
an input that receives information for a public event at a venue;
a processor that determines locations of a plurality of client computers at the venue, and controls wirelessly communicating with said plurality of client computers; and
a wireless output part, creating a wireless output stream directed to a plurality of different client computer devices, and based on a control by said processor, where said processor creates said wireless stream based on said information and based on said locations of said client computers, where said wireless stream provides location interactive information to the different computer devices about said public event, where the location interactive information is information related to a lighting show that is being currently carried out at the venue, and where a first client computer device at a first location receives different information than a second client computer device at a second location.

2. The system as in claim 1, wherein said location interactive information includes map information about the venue based on the client's current location.

3. The system as in claim 1, wherein said location interactive information is lighting information, where different client computer devices a different location receive different parts of the lighting information.

4. The system as in claim 1, wherein said information about said public event is a part of a lighting show, related to a lighting show being carried out at said public event.

5. The system as in claim 4, wherein said lighting show is an individual pixel intended to be displayed along with multiple different individual pixels of other clients.

6. The system as in claim 4, wherein said lighting show is a magnified view of a stage to be displayed on the user's individual client.

7. The system as in claim 1, wherein said information about said public event is a map of the public venue.

8. The system as in claim 1, wherein said information about the public event includes information about ordering items.

9. The system as in claim 1, wherein said computer receives information from an individual ticket.

10. A method of operating a computer system, comprising:
receiving information about a public event at a venue;
in a computer, determining locations of a plurality of client computers at the venue, and controlling wirelessly communicating with said plurality of client computers;
creating a wireless output stream at said event directed to a plurality of different client computer devices and based on a control;
creating said wireless stream based on said information and based on said locations of said client computers, where said wireless stream provides location interactive information to the different computer devices about said public event, where the location interactive information is information related to a lighting show that is being currently carried out at the venue, and where a first client computer device at a first location receives different information than a second client computer device at a second location.

11. The method as in claim 10, wherein said event information is local map information about the venue based on the user's current location.

12. The method as in claim 10, wherein said event information is lighting information related to a lighting show that is being currently carried out at the venue, where different client computer devices at different locations receive different parts of the lighting information.

13. The method as in claim 12, wherein said lighting information is formed of multiple pixels, and the user receives only a single pixel.

14. The method as in claim 12, wherein said lighting show is a magnified view of a stage to be displayed on the user's individual client computer.

15. The method as in claim 10, wherein said entering comprises entering individual information from a ticket.

16. The method as in claim 15, wherein said entering comprises scanning a code from a ticket.

\* \* \* \* \*